(No Model.)
S. D. STROHM.
SUBTERRANEAN CONDUIT FOR ELECTRICAL CONDUCTORS.
No. 247,431. Patented Sept. 20, 1881.
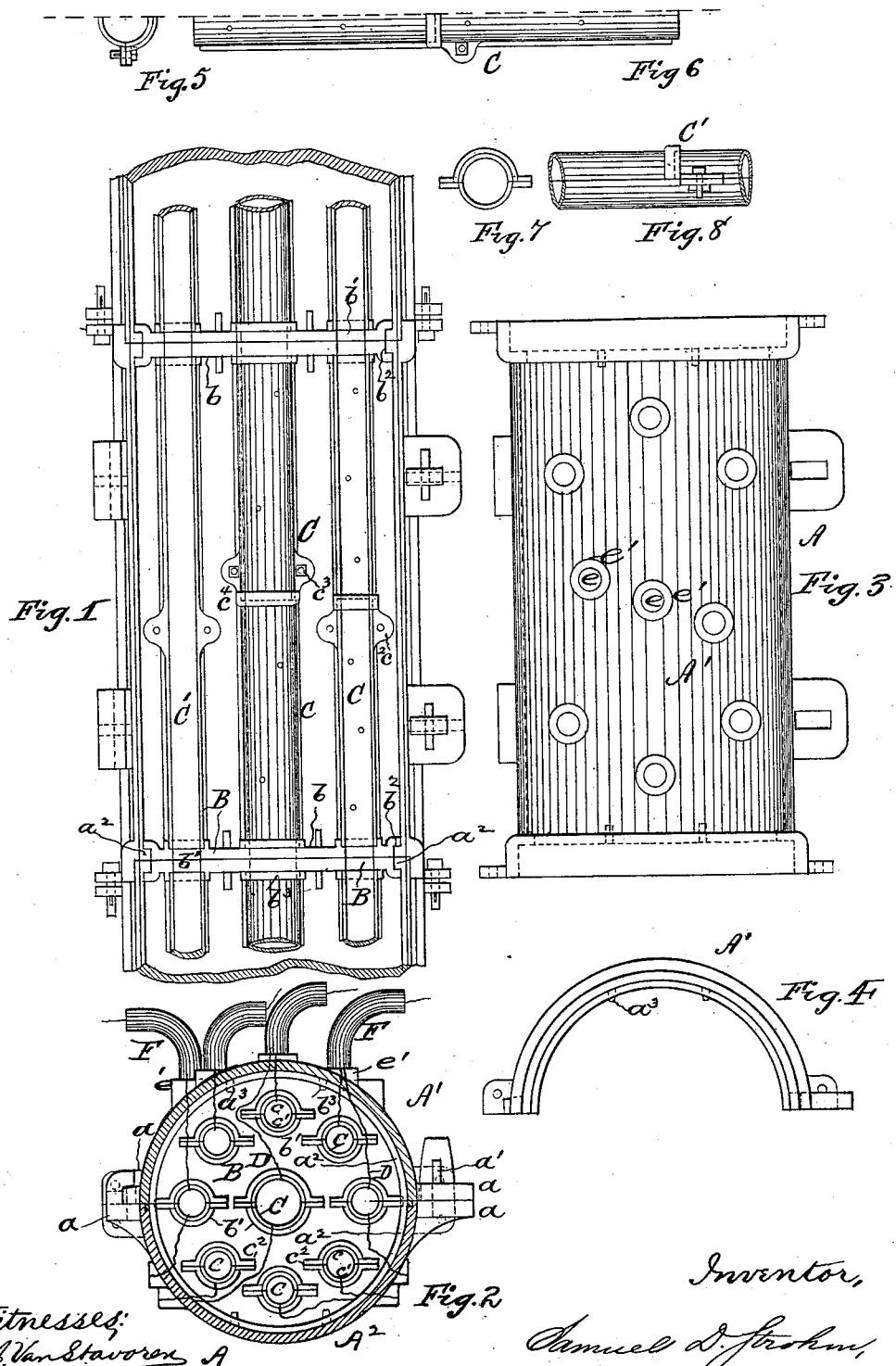

UNITED STATES PATENT OFFICE.

SAMUEL D. STROHM, OF PHILADELPHIA, PENNSYLVANIA, ASSIGNOR OF ONE-HALF TO HARRISON SNYDER, OF SAME PLACE.

SUBTERRANEAN CONDUIT FOR ELECTRICAL CONDUCTORS.

SPECIFICATION forming part of Letters Patent No. 247,431, dated September 20, 1881.

Application filed February 19, 1881. (No model.)

*To all whom it may concern:*

Be it known that I, SAMUEL D. STROHM, a citizen of the United States, residing at the city of Philadelphia, in the State of Pennsylvania, have made certain new and useful Improvements in Subterranean Conduits for Electrical Conductors; and I do hereby declare that the following is a full, clear, and exact description of the same, reference being had to the accompanying drawings, forming part of this specification, wherein—

Figure 1 is a longitudinal, and Fig. 2 a transverse vertical, section. Fig. 3 is a side elevation of the external casing. Fig. 4 is an end elevation of said casing. Figs. 5, 6, 7, and 8 are detail views of the interior tubes or pipes.

My invention has relation to systems in which pipes, tubes, or other conduits are employed for the reception, protection, and insulation of wires, cables, or other conductors of electrical currents to be employed for telegraphic, telephonic, lighting, heating, and other purposes.

My improvements have for their object to provide conduits which can be constructed at light expense, which can be readily put together and taken apart, and which, when in position for use, form a perfectly-tight covering and effective insulator for wires, cables, and other conductors of electrical currents.

My invention consists of a multitubular conduit composed of an external shell or main casing with internal tubes or pipes running longitudinally through the same, said casing and tubes being formed of sections united lengthwise together and end to end and provided with an insulating-lining, the tubes being supported at either end within the casing upon diaphragms fitted in the latter.

Referring to the accompanying drawings, A represents the exterior casing, formed in two sections, A' and A², each of which has external ribs or flanges, $a\,a$, whereby said sections may be secured together by key-bolts $a'$, or equivalent fastening, to form a complete cylinder. The sections are designed to be put together with the part A' on top of the section A², so that the former will serve as a removable cap to the latter, permitting access to the interior whenever required. Said sections are also formed at either end with internal annular flanges, $a^2$ $a^2$, which come together when said sections are aligned.

B represents diaphragms, which may be disks forming a complete circle or in sections $b\,b$. Said diaphragms have annular grooves $b^2$ in their peripheries, into which the flanges $a^2$ fit, whereby the cylinders are held together end to end. Said diaphragms are also formed with numerous openings, $b'\,b'$, for the passage of pipes or tubes C C, for which latter said diaphragms thus form bearings or supports. Said diaphragms may also have peripheral sockets $b^3\,b^3$, to receive dowels $a^3$, projecting inwardly from the casing A, whereby they are firmly stayed in position. The tubes C are also formed in sections $c\,c'$, fitted together so that one forms a cap for the other, and are made with longitudinal ribs or flanges $c^2$, secured together by key-bolts $c^3$, or equivalent fastening. One end of each section is formed enlarged, as shown at $c^4$, to afford a socket for the adjacent end of the next section and produce a joint which may be made tight by packing or composition of any suitable character. These joints should be located at or about midway of the sections of the exterior casings, or at any convenient point between the supporting-diaphragms C. Said casing and tubes, either or both, are lined with enamel, porcelain, gutta-percha, or other material which forms a good insulator, and which may be applied either while said parts are in process of construction or after the same have been made. In this way said casing and tubes may be made of metal, which, in this manner, form a perfect insulator for the wires D or other conductors laid therein. The casing and internal tubes may also be formed with lateral openings $e\,e$, having hollow bosses $e'\,e'$, for the attachment of pipes F, through which branch wires or conductors may be led at such intervals as the requirements of cases will demand.

The system of conduits herein described may be laid under ground or on the surface, or submerged under water, or sustained upon poles or other supports, or in or upon the walls of buildings, and will form a perfect protector and insulator for the conductors contained therein.

If desired, the internal tubes may be made in three sections, two of said sections being joined together, as shown at C', Fig. 8 of drawings, and forming a removable cap for the third or lower section. One of the upper sections is provided with an enlarged head, fitting over the end of the adjacent upper section, and serving to hold the same in place.

What I claim as my invention is as follows:

1. The sections $A'$ $A^2$, having external longitudinal flanges, $a\,a$, and internal flanges, $a^2\,a^2$, substantially as shown and described.

2. In combination with the sections $A'$ $A^2$, having internal flanges or ribs, $a^2$, the diaphragms B, having peripheral grooves $b$, for the reception of the ribs $a^2$, substantially as shown and described.

3. In an electrical conductor, the combination, with the external casing, A, made in longitudinal sections, and diaphragms B, having openings $b'$, of the longitudinally-divided pipes or tubes C C, supported on said diaphragms, substantially as shown and described.

4. The internal pipes or tubes, C C, made in longitudinal sections, and having their upper halves divided in cross-section, to permit of access to the interior of said pipes or tubes, substantially as described.

In testimony that I claim the foregoing I have hereunto set my hand this 16th day of February, 1881.

SAMUEL D. STROHM.

Witnesses:
S. J. VAN STAVOREN,
CHAS. F. VAN HORN.